United States Patent [19]
Murphy et al.

[11] Patent Number: 5,649,475
[45] Date of Patent: Jul. 22, 1997

[54] UNIVERSAL ROTISSERIE ASSEMBLY

[75] Inventors: Armand J. Murphy, Salem; James L. Troupe, Huntsville; David O. Mize, Decatur; Clinton R. Blasingame, Huntsville, all of Ala.

[73] Assignee: W.C. Bradley Company, Columbus, Ga.

[21] Appl. No.: 693,699

[22] Filed: Aug. 7, 1996

Related U.S. Application Data

[60] Provisional application No. 60/002,235 Aug. 11, 1995.

[51] Int. Cl.$^6$ .................................................. A47J 37/00
[52] U.S. Cl. .............. 99/421 H; 99/421 R; 99/421 HV; 126/25 R; 126/9 R
[58] Field of Search ..................... 99/419–421 V, 99/339, 340, 449, 450, 481, 482; 126/25 R, 25 A, 9 R, 25 AA; 248/231.21–231.91

[56] References Cited

U.S. PATENT DOCUMENTS

| | | | |
|---|---|---|---|
| 2,046,352 | 7/1936 | Warner | 99/421 HV |
| 2,505,976 | 5/1950 | Leon | 99/421 HV |
| 2,819,667 | 1/1958 | Victor | 126/25 R |
| 2,845,856 | 8/1958 | Sack | 99/421 HV |
| 2,999,428 | 9/1961 | Mariani | 248/231.7 X |
| 3,247,779 | 4/1966 | Willman | 99/421 HV |
| 3,442,202 | 5/1969 | Ishida | 99/421 R |
| 3,473,464 | 10/1969 | Lasker | 99/421 R |
| 3,742,839 | 7/1973 | Maley | 99/421 HV |
| 4,469,019 | 9/1984 | Baer | 99/421 HV |
| 4,817,514 | 4/1989 | Hitch et al. | 99/419 |
| 4,924,766 | 5/1990 | Hitch | 99/421 HV |
| 5,224,676 | 7/1993 | Johnston | 248/231.71 |

*Primary Examiner*—Timothy F. Simone
*Attorney, Agent, or Firm*—James W. Kayden; Thomas, Kayden, Horstemeyer & Risley, LLP

[57] ABSTRACT

A rotisserie assembly is disclosed that comprises brackets for holding a rotisserie unit. The brackets are universally adaptable so that they can be used to support a rotisserie unit on a variety of grill styles and models. The rotisserie assembly further includes a handle for a rotisserie rod and forks that attach to a rotisserie rod and support food thereupon.

14 Claims, 4 Drawing Sheets

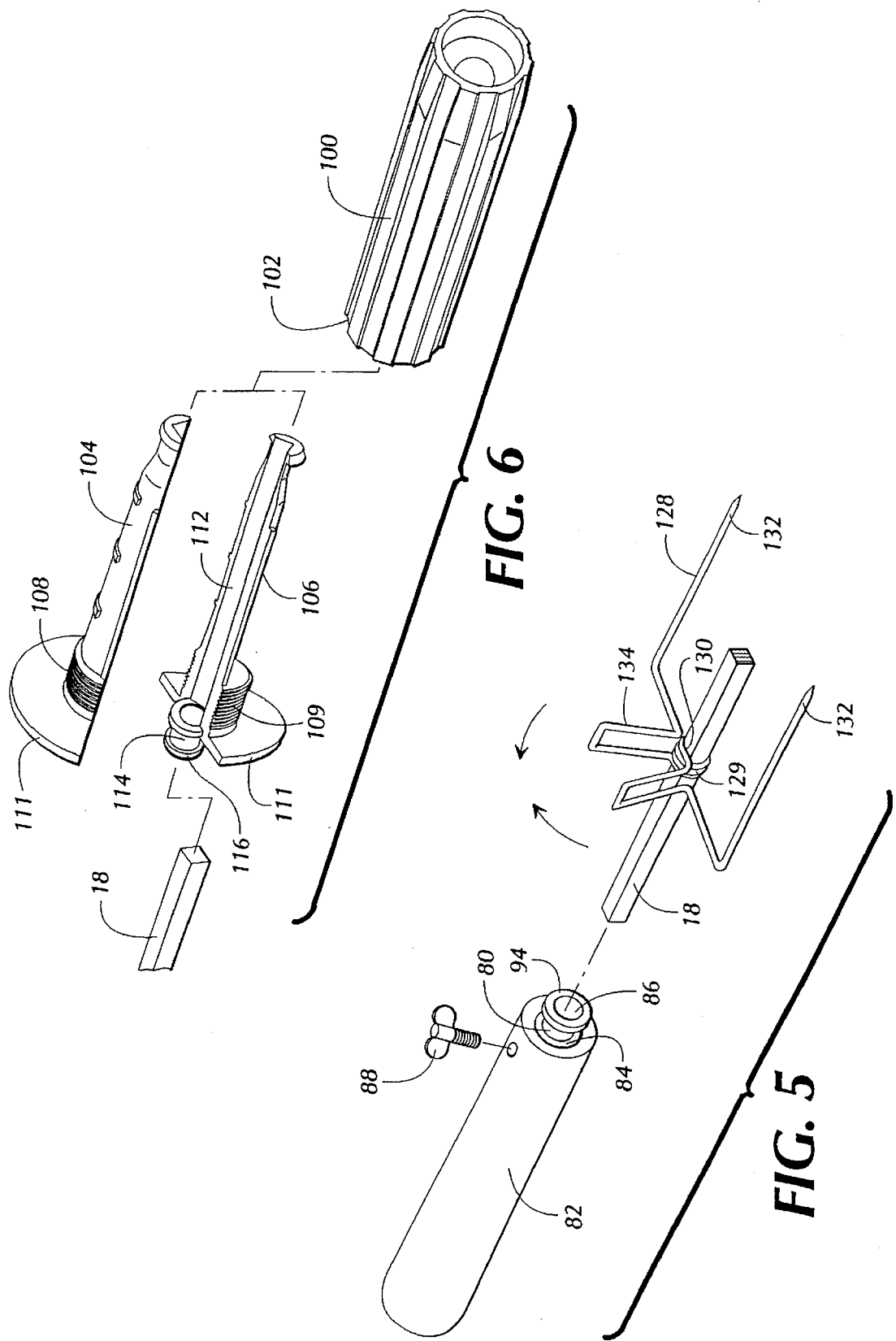

UNIVERSAL ROTISSERIE ASSEMBLY

PRIOR APPLICATIONS

This application is based on provisional application Ser. No. 60/002,235, filed on Aug. 11, 1995.

FIELD OF THE INVENTION

The invention relates to a rotisserie assembly for use in cooking foods on a barbecue grill having a firebox and a hood. More particularly, the invention relates to an improved rotisserie assembly including universal rotisserie brackets for mounting the rotisserie unit on a variety of different manufacturers' models, a rotisserie rod handle assembly, and a rotisserie fork for securely mounting and holding food onto a rotisserie rod.

BACKGROUND OF THE INVENTION

Outdoor barbecue grilling is a common pastime and method of cooking in the United States and elsewhere. Oftentimes, food is cooked using a rotisserie unit which supports and rotates the food over the coals or heating element in a firebox. The firebox is typically covered with a hood which holds in the heat and smoke during cooking to cook and flavor the food. The rotisserie unit includes a rod which supports and rotates the food over the hot coals or burner. The rod may be supported through the food, for example if the food is a whole chicken, the rod may be inserted through the central cavity of the chicken. Additionally, most rotisserie units include an electric motor which receives one end of the rod and causes the rod to rotate. The motor and the distal end of the rod are usually supported by brackets which are mounted to either the opposing sides of the firebox or to shelves next to the firebox. In addition, the rotisserie unit may or may not include a rotisserie rod handle on the distal end of the rod and may include one or more rotisserie forks attached to the rod to assist in holding the food and causing it to rotate along with the rod.

Typically, one end of the rotisserie rod attaches to the motor by inserting into a fitted hole in the motor. The distal end of the rod typically has a handle to aid in the placement and movement of the rod. The rod itself may be either of square or circular cross-section. Both ends of the rod are typically supported either by the firebox or by brackets attached at either end of the firebox. A semicircular notch in the upper circumferential edge of the firebox or in the bracket is sometimes provided to support the rod and facilitate its rotation. If the rod is square, however, the provision of such a notch does not improve rotation.

Rotisserie units generally are not supplied with a barbecue grill when the grill is purchased but are instead sold as after-market accessories. Due to the different configurations of fireboxes supplied by the different grill manufacturers, it is important that the rotisserie unit be universally adaptable. Accordingly, rotisserie unit brackets have been designed with this feature in mind. For example, U.S. Pat. No. 5,224,676 to Johnston teaches a rotisserie bracket assembly wherein the bracket which holds the motor attaches to a side shelf of the barbecue grill. This assembly is thus designed to support a rotisserie unit regardless of the shape of the firebox. Barbecue grills typically have a hood that generally is closed while cooking to enhance the cooking and flavoring of the food. Many grill hoods have 2 notches cut in a lower circumferential edge to allow for passage of the rotisserie rod. However, the hood may not have these notches or they may not be appropriately sized. Thus, the bracket assembly taught by Johnston is not useful for all types of barbecue grills because with some grills the hood contacts the rotisserie rod when the hood is closed. This prevents the rod from rotating properly and causes excess wear and tear on the rotisserie rod and the motor.

Another problem typically encountered when using rotisserie units is that the food is not tightly attached to the rotisserie rod and the food will not rotate with the rod but rather the rod will freely rotate within the food. Methods have been developed which cause the food to rotate along with the rod. For example, U.S. Pat. No. 5,001,971 to Beller teaches a shish-kabob rotisserie having double skewer members arranged around a center rod, with each skewer having one end releasibly attached to the rod. The skewers are not adjustable as to length, so that food items of all sizes must fit onto the skewers. U.S. Pat. No. 3,473,464 to Lasker teaches a rotisserie assembly wherein skewers are held between two disks fixedly connected to a rotisserie rod and are detachable from the disks. However, the size of the food item being cooked is limited by the length of the skewers. In addition, this assembly is difficult to assemble and disassemble for cleaning.

SUMMARY OF THE INVENTION

The present invention relates to a universal rotisserie assembly for cooking food over a barbecue grill or other cooking apparatus. The assembly comprises a pair of brackets for holding the rotisserie motor and rod that are universally applicable to a variety of grill manufacturers' models. The brackets are configured to allow free rotation of the rotisserie rod when the grill hood is closed over the firebox. The rotisserie assembly further includes a rotisserie rod handle which provides for better rotation of the rotisserie rod in a bracket even when the rotisserie rod has a non-circular cross section. An improved fork is provided which is adjustable to any position and easily removable from the rotisserie rod.

It is, therefore, one of the principal objects of the present invention to provide a rotisserie assembly for use on a barbecue grill which is universally applicable and which allows for free rotation of the rotisserie rod when the grill hood is closed over the firebox.

Another object is to provide a rotisserie rod handle which enables free rotation of a square rod in a rotisserie bracket.

A further object of the present invention is to provide universally applicable rotisserie forks which attach to a rotisserie rod and are adjustable to allow for various sizes of food to be mounted thereon and which are easily detachable from the rod.

A still further object of the present invention is to provide a pair of universal rotisserie brackets for holding a rotisserie motor and supporting and allowing rotation of a rotisserie rod. The brackets can be attached to a variety of types of barbecue grill fireboxes.

BRIEF DESCRIPTION OF THE DRAWINGS

FIG. 5 is an exploded perspective view of one embodiment of the handle assembly and the rotisserie fork.

FIG. 6 is an exploded view of an additional embodiment of the handle assembly.

DETAILED DESCRIPTION OF THE PREFERRED EMBODIMENTS

Figure 1:
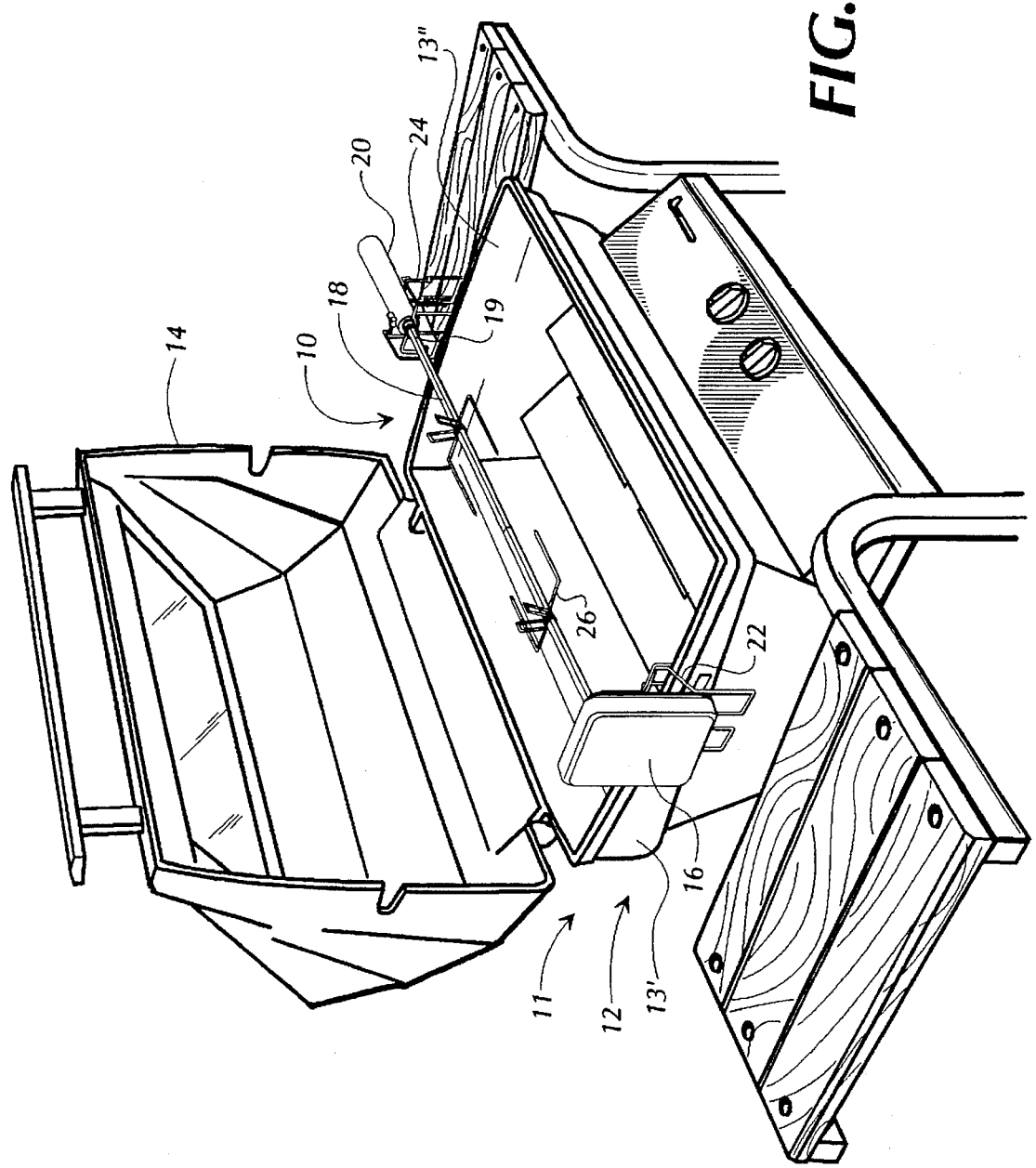
FIG. 1 is a perspective view of a barbecue grill showing the rotisserie assembly of the present invention.

Referring now in greater detail to the drawings, and to FIG. 1 in particular, a rotisserie assembly 10 is shown in an installed position, mounted on the firebox 12 of a barbecue grill. As shown in FIG. 1, the barbecue grill 11 includes a substantially rectangularly shaped firebox 12, having side walls 13. The grill further includes a hood 14, shown in the open position, which is sized and shaped to cover the firebox during cooking.

The rotisserie assembly 10 includes a motor 16 and a rotisserie or spit rod 18 adapted to receive and support food thereon during cooking. The rod 18 attaches to the motor 16 as is generally known in the art. Handle assembly 20 is on the distal end 19 of rod 18. Motor 16 is supported on a sidewall 13 of the firebox 12 by a motor support bracket 22 which mounts to the sidewall 13 of the firebox and is adapted to provide for vertical adjustment of the motor. The distal end 19 of rod 18 is supported by rod support bracket 24 which mounts to the opposite sidewall of the firebox 12. The rotisserie assembly further includes one or more rotisserie forks 26 mounted on the rod 18.

Figure 2:
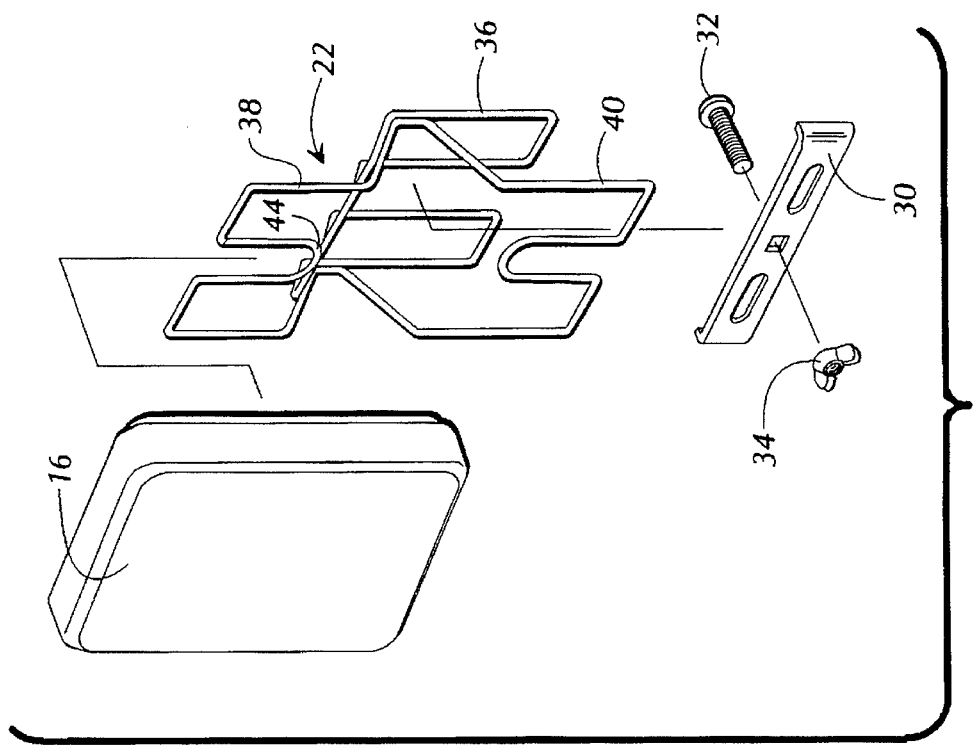
FIG. 2 is an exploded perspective view of the motor support bracket, illustrating a method of mounting the bracket and motor.

As shown more specifically in FIG. 2, motor support bracket 22 includes three substantially vertical portions, the lower portion 36, lower portion 40 and upper portion 38. Each portion 36, 38, and 40 comprises two rectangularly shaped segments. The portion 36 is used to mount the bracket to the side of the firebox 12 by means of a mounting band 30 which straps across portion 36 of the bracket and holds it to the firebox. A mounting screw 32 inserts through an aperture 31 on the band 30 and through an aperture on the firebox and is engaged by wingnut 34 on the opposite side of the firebox wall. This method of attaching the bracket works for some grill fireboxes that have an appropriate single centered hole. Some fireboxes, however, do not have a single centered hole for mounting a rotisserie unit, but instead are provided with two vertically oriented apertures for this purpose. For use with fireboxes such as these, the two outside apertures 33 of the band are preferably used for mounting the bracket. By providing alternate positioned apertures on the band, the bracket can be mounted to various firebox styles.

The bracket is reversible in that any of the three vertical portions 36, 38 and 40 can be attached to the grill or can hold the motor, depending upon the shape of the firebox. The motor is normally supplied with spaced right angular clips on the inside wall thereof which extend outwardly therefrom and parallel thereto forming a recess therebetween for receiving the portion 38, as shown in FIG. 2. The portion 38 is substantially U-shaped in configuration having a central recess 44 which may support the end of the rod which is coupled to the motor.

Figure 4:
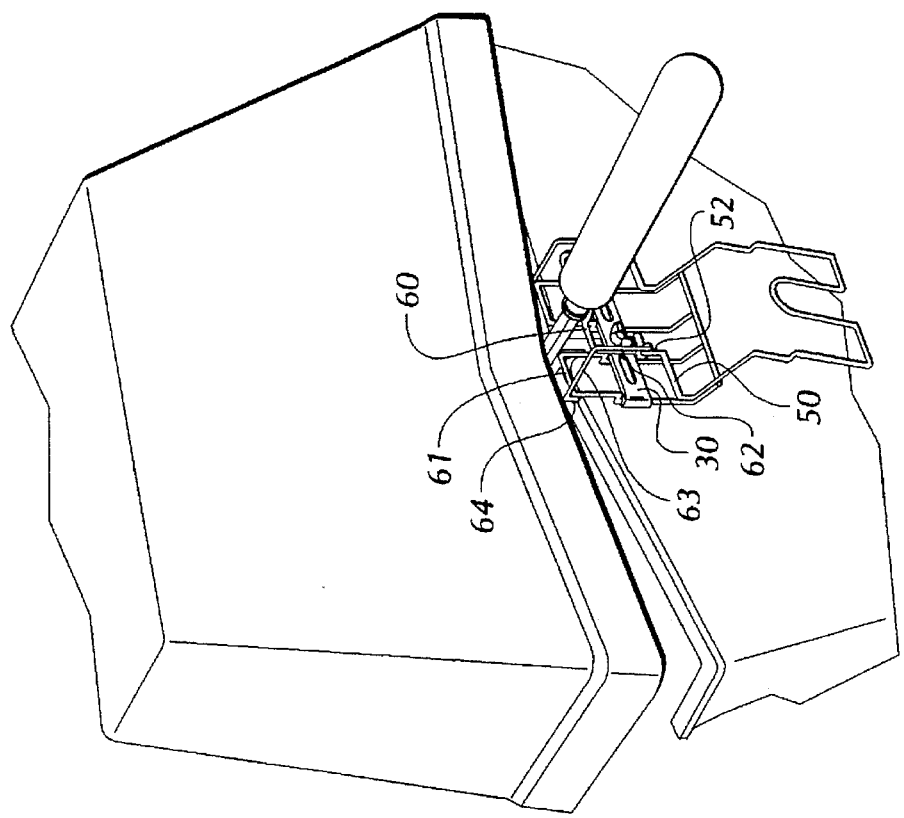
FIG. 4 is a perspective view of the rod support bracket showing the hood prop engaged.
Figure 3:
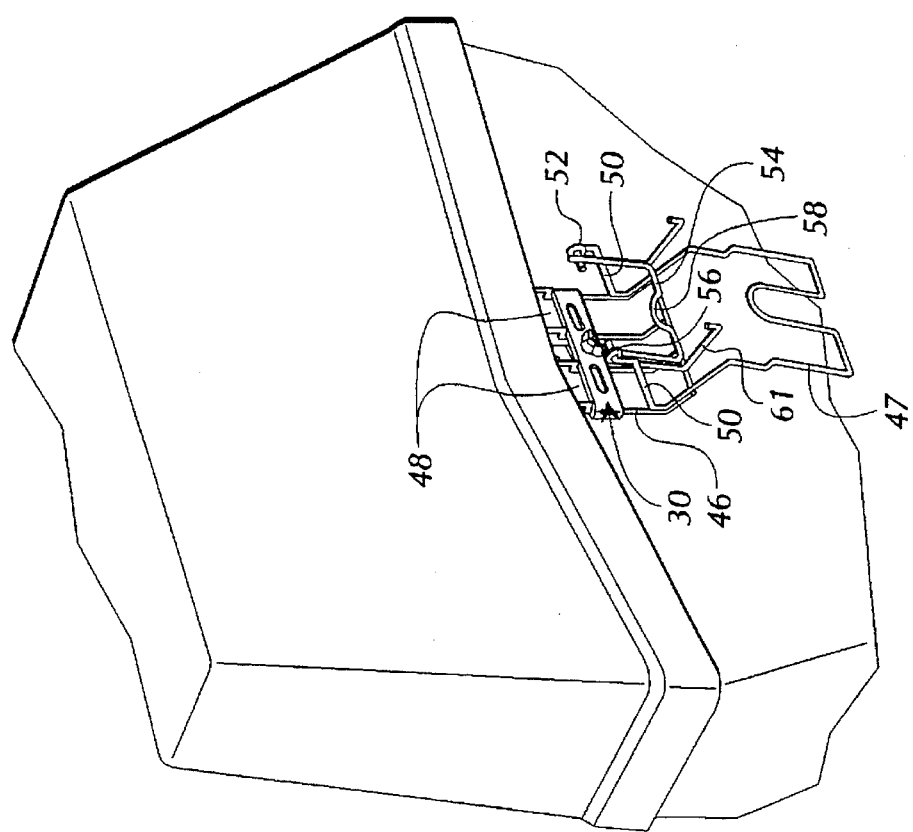
FIG. 3 is a perspective view of the rod support bracket mounted to a side wall of the barbecue grill and showing the hood prop unengaged.

The rod support bracket 24 is mounted to the opposite side of the firebox in a similar manner, as shown in FIGS. 3 and 4, using a mounting band 30 strapped across mounting portion 46 of rod mounting bracket 24. Vertical mounting portion 46 has two substantially rectangular arms 48. Prop supporters 50 extend at an angle from the lower part of arms 48 and end in perpendicularly disposed prop receiving portions 52. Hood prop 54 is pivotally mounted on prop receiving portions 52 to rotate thereabout. Hood prop 54 is a single length of wire twisted at either end to form pivots 56 which each form one corner of the hood prop and which mount onto and pivot about prop receiving portions 52. An M-shaped portion 58 is disposed between pivots 56 and contains a U-shaped, rod receiving recess 60. Hood supports 61 are the ends of the wire extending from pivots 56 and having first parts 62 parallel with the arms of the M-shaped portion 58, second parts 63 perpendicular to said first parts and third parts 64 parallel to said first parts. The third parts 64 are disposed to clip over the arms 48 of portion 46 and releasibly attach hood prop 54 in position so that the U-shaped recess 60 can support the rotisserie rod 18 and the second parts 62 will prop the hood 14 of the firebox 12 away from the rotisserie rod 18 so that the hood will not interfere with the rotation of the rod (as shown in FIG. 4). Alternatively, the third parts 64 of hood prop 54 can be unclipped from the arms 48 of the portion 46 and pivoted around prop receiving portions 52 to avoid contact of hood prop 54 with the hood 14 (as shown in FIG. 3).

Figure 7:
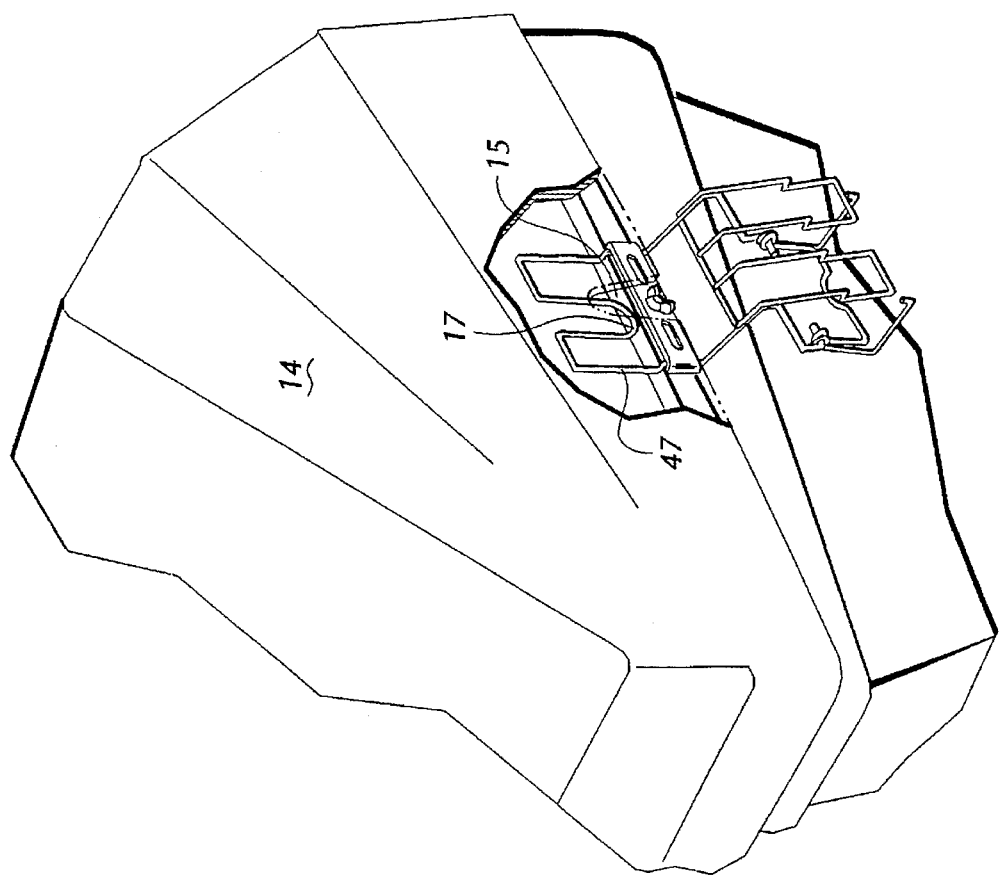
FIG. 7 is a perspective view of the rod support bracket mounted to a side wall of the barbecue grill in an alternative manner, with portions of the grill hood broken away for clarity.

A second way of mounting the rod support bracket 24 is shown in FIG. 7, for a grill which does not require use of the hood prop. Band 30 wraps across vertical portion 47 and mounting screw 32 is inserted through band aperture 31 and through the single aperture on the grill firebox lip and secured with wingnut 34. A portion 15 of the hood 14 is notched so that the rod 18 can pass through the hood. The rod rests upon U-shaped rod support 17 after it exits the hood.

Rotisserie rod 18 is an elongated rod having either a circular or square cross section. Most preferably it has a square cross section as such is compatible with the square rod receiving socket of the motor 16. Obviously, a rod having a square cross section will not rotate smoothly in the U-shaped recesses of the brackets. Therefore, as shown in FIGS. 5 and 6, handle assembly 20 is provided with a cylindrical collar 80 which rests in and freely rotates about the U-shaped recess 60 of the rod support bracket 24. The handle assembly 20 is adjustable on the rod so that it can be used with rotisserie assemblies on grills having fireboxes of varying widths. In addition, the handle assembly can be easily removed from rod 18 for easy cleaning.

In one embodiment of the handle assembly, shown in FIG. 5, the collar 80 is received in a longitudinal bore 84 of handle grip 82. The longitudinal bore 84 has a wider diameter of the end which receives the collar 80 so that a seat is formed for the collar 80. The collar outer diameter is expanded in this region received in the bore. Collar 80 also has a longitudinal bore 86 therethrough which receives the rod 18. The bore 84 of the grip and bore 86 of the collar are substantially of the same diameter. A first threaded aperture 90 on the handle grip and a second threaded aperture of the collar can be aligned to receive a threaded fastener such as wing nut 88. When the rod 18 is in place in the respective bores, the fastener will meet the rod 18 and hold it stationery within the bores. Collar 80 as well will be held in place within the bore 84 of the handle grip 82. Collar 80 has a collar flange 94 which serves to help hold the collar and thus the rod from axial movement within the U-shaped recess 60 of the rod support bracket.

A second embodiment of the handle assembly of the present invention is shown in FIG. 6. Handle grip 100 is an elongated cylinder with an inner threaded region 102 at the proximal end. Inner left handle 104 and inner right handle 106 are near mirror images of each other, each comprised of outer threaded portions 108 and 109, flange portions 110, and rod support regions 112. The outer threaded portions 108 and 109 are such that when the inner left handle 104 and inner right handle 106 are placed together to form an inner handle a complete threaded area is formed. The rod support regions align to form an inner handle with a rectangular bore partially therethrough. The portion of the bore which is defined by the flange pieces 110 is cylindrical and receives cylindrical collar 114. Collar 114 has a cylindrical bore defined therethrough for receiving rotisserie rod 18 which is also received through the rectangular bore defined by the inner handles.

After inserting the rod 18 through the bores, the handle grip 100 inner threaded portion 102 is threaded over the threaded portion 108 and 109 of the inner left and inner right handles causing them to tighten against the rotisserie rod 18 and the collar 114 and hold the rotisserie rod 18 tightly within the inner handles.

Fork 26 is shown in FIG. 5 as preferably comprising a single piece of wire 128 twisted to serve both as a rotisserie fork and a rotisserie fork rod securing means. The middle of the wire is twisted to form a torsion spring 129 having a longitudinal cylindrical opening 130. The longitudinal axis of the spring is substantially parallel with the longitudinal axis of the rotisserie rod 18 inserted through opening 130. The wire 128 is further twisted so that each end of the cylindrical wire forms a pointed tine 32 of the rotisserie fork. Tines 32 have a longitudinal axis substantially parallel to the axis of the rotisserie rod. The wire 128 is bent between each tine 132 and the torsion spring 129 to form two rectangularly shaped handles 134 which extend at an angle from the horizontal axes of the torsion spring opening, the tines, and the rod. When the handles 134 are squeezed towards one another, the circular opening 130 of the torsion spring expands and the rotisserie rod can be inserted therethrough. Once the fork is at the desired position on the rotisserie rod, the handles are released, the spring opening contracts, and the fork is secured onto the rotisserie rod. Once secured, the rotisserie fork rotates in unison with the rotisserie rod. Two or more rotisserie forks 26 can be used in combination on a rotisserie rod to hold the food securely therebetween, for example.

The invention has been described in detail with particular reference to the preferred embodiments. It will be understood that variations and modifications can be effected within the spirit and scope of the invention and the claims appended hereto.

What is claimed is:

1. A rotisserie assembly for use in operating a rotisserie rod with a barbecue grill having a hood comprising:
    a motor mounting bracket and a rod support bracket, wherein both said motor mounting bracket and said rod support bracket have at least two vertical portions adapted for attaching each said bracket to a wall of barbecue grills of various configurations; said vertical portions including substantially horizontal segments comprising a recessed portion adapted to receive and support the rotisserie rod; and said rod support bracket having means to selectively prop open the hood of the barbecue grill;
    a rotisserie rod handle assembly adapted to releasibly attach to one end of the rotisserie rod, said handle comprising a cylindrical collar so that said collar will be received in said recessed portion of said rod support bracket and allow free rotation of the rod; and
    at least one rotisserie fork comprising a torsion spring defining a central opening, at least one tine extending from said spring, and means to adjust said torsion spring so that said fork can be placed in a desired position on a rotisserie rod inserted through said central opening.

2. The rotisserie assembly of claim 1, wherein said rod handle assembly further comprises a handle grip having a longitudinal central bore therethrough and said collar has a longitudinal bore therethrough that aligns with said grip central bore for receiving a rotisserie rod; and said handle assembly further comprises means for holding said collar stationary within said handle grip and maintaining said grip stationary on the rod.

3. The rotisserie handle assembly of claim 2, wherein said cylindrical collar of said handle assembly includes a first expanded end and a second expanded end and wherein said central bore of said grip is expanded at one end so that a seat is formed in said grip to receive said collar first expanded end.

4. The rotisserie assembly of claim 2, wherein said holding means of said handle assembly comprises a fastener and fastener apertures in said handle grip and said collar for receiving said fastener, so that when said fastener is inserted through said apertures, a rod received in said bores of said collar and said grip will be held securely in a desired gripping position.

5. The rotisserie assembly of claim 2, wherein said handle grip of said handle assembly comprises an inner left handle and an inner right handle, each having a threaded region that, when the left and right inner handles are placed in alignment, form a complete threaded portion, wherein said aligned inner handles define a substantially rectangular bore extending therethrough when placed together;
    said handle assembly further comprising an outer handle having a cylindrical bore at least partially therethrough with inner threads on the proximal end thereof so that said outer handle threads onto said threaded region of said aligned left and right inner handles; and
    wherein said holding means comprises tightening said outer handle inner threads onto said inner threaded region so that said left and right inner handles are squeezed together and said collar and a rotisserie rod received therethrough are secured in place.

6. The rotisserie assembly of claim 2, wherein said longitudinal bores of said collar of said handle assembly and said grip are adapted to receive a substantially rectangular rotisserie rod.

7. The rotisserie assembly of claim 2, wherein said longitudinal bores of said collar of said handle assembly and said grip are adapted to receive a substantially cylindrical rotisserie rod.

8. A rotisserie bracket assembly for mounting a rotisserie unit having a motor and a rotisserie rod to be used in conjunction with a barbecue grill having a firebox and a hood, comprising:
    a motor support bracket and a rod support bracket;
    means for securing said motor support and rod support brackets to opposing sides of the firebox;
    said motor support bracket having a first upper portion designed for receiving a rotisserie motor; and
    said rod support bracket having a portion designed for supporting a rotisserie rod and having means for propping open a hood of a barbecue grill to prevent the hood from contacting the rod.

9. The rotisserie bracket assembly of claim 8, wherein said motor support bracket further comprises a portion having a recess adapted to receive a rotisserie rod.

10. A rotisserie fork for mounting onto a rotisserie rod, comprising:

a torsion spring defining a cylindrical opening having a longitudinal axis;

at least one tine generally parallel to said opening longitudinal axis;

at least two handles connected to said torsion spring and controlling the diameter of said opening of said torsion spring;

so that said handles can be manipulated to adjust the diameter of the torsion spring opening in order to position said fork on a rotisserie rod inserted through said opening.

11. A rotisserie fork assembly for a rotisserie rod, comprising:

at least one fork body mounted on said rotisserie rod and having at least one longitudinally extending tine for engaging a food article;

means for securing said fork body in a desired position along the rotisserie rod; and handle means connected to said means for securing for selectively releasing said means for securing from engagement with the rotisserie rod to enable said fork body to be moved along the rotisserie rod to position said fork body in a desired arrangement along the rotisserie rod.

12. A rotisserie assembly mountable on the side walls of a barbecue grill for cooking articles of food on the barbecue grill, comprising:

a rotisserie rod on which the articles of food are received and supported for cooking, having a first end and a second end;

bracket means for supporting said first and second ends of said rotisserie rod on the barbecue grill, said bracket means including first, second and third vertical portions, with said first and second portions adapted to mount said bracket means to the side walls of barbecue grills of varying configurations;

at least one rotisserie fork received on said rotisserie rod and movably positionable therealong for engaging and securing the articles of food against said rotisserie rod and against slippage thereabout, said rotisserie fork further including means for securing said rotisserie fork in a desired position along said rotisserie rod; and means for rotating said rotisserie rod connected to one end of said rotisserie rod.

13. The rotisserie assembly of claim 12 and wherein said means for rotating said rotisserie rod comprises an electric motor connected in a driving relationship to said second end of said rotisserie rod.

14. The rotisserie assembly of claim 12 and further including a handle assembly mounted to said first end of said rotisserie rod.

\* \* \* \* \*